Dec. 5, 1961   J. BOUVAT-MARTIN   3,011,837
AXLE BOXES, NOTABLY FOR LUBRICATING THE
UPPER AND LOWER BEARINGS THEREOF
Filed July 7, 1959   3 Sheets-Sheet 1

United States Patent Office 3,011,837
Patented Dec. 5, 1961

3,011,837
AXLE BOXES, NOTABLY FOR LUBRICATING THE UPPER AND LOWER BEARINGS THEREOF
Jean Bouvat-Martin, Paris, France, assignor to Societe Generale Isothermos, Paris, France, a societe anonyme
Filed July 7, 1959, Ser. No. 829,176
Claims priority, application Great Britain July 8, 1958
2 Claims. (Cl. 308—86)

This invention relates to axle boxes of railway cars and has specific reference to improvements in axle boxes with a view to lubricate their upper and lower bearings in an efficient and reliable manner.

It is known, in axle boxes comprising an upper bearing and a member for taking oil from the bottom of the box, for example a dipper disc or dasher, to lubricate the bearings by collecting oil in an upper recess or cavity of the bearing by dripping, running or splashing, according to the velocity of rotation, and to distribute this oil by means of feed passages along the bearing bore.

It is also known to improve the lubrication of stub shafts with the assistance of a lower bearing or counter-bearing and to feed same through lateral ducts or channels formed internally of the box-body, and also to recover a substantial portion of the oil dripping along the inner walls of the box, for example according to the arrangement proposed in my prior Patent No. 2,838,347.

It is the essential object of this invention to provide an arrangement utilizing the counter-bearing as a lubricating member even at moderate speeds; this result is obtained by feeding the counter-bearing directly.

To this end, the upper bearing is modified along its lateral edges overlying the stub shaft so as to constitute two distributors located as close as possible to the oil-dripping or running zone and arranged to release the oil directly upon the counter-bearing.

In order to afford a clearer understanding of this invention and of the manner in which the same may be carried out in the practice, reference will now be made to the accompanying drawings forming part of this specification and illustrating diagrammatically by way of example a typical form of embodiment of the invention. In the drawings.

Figure 1:
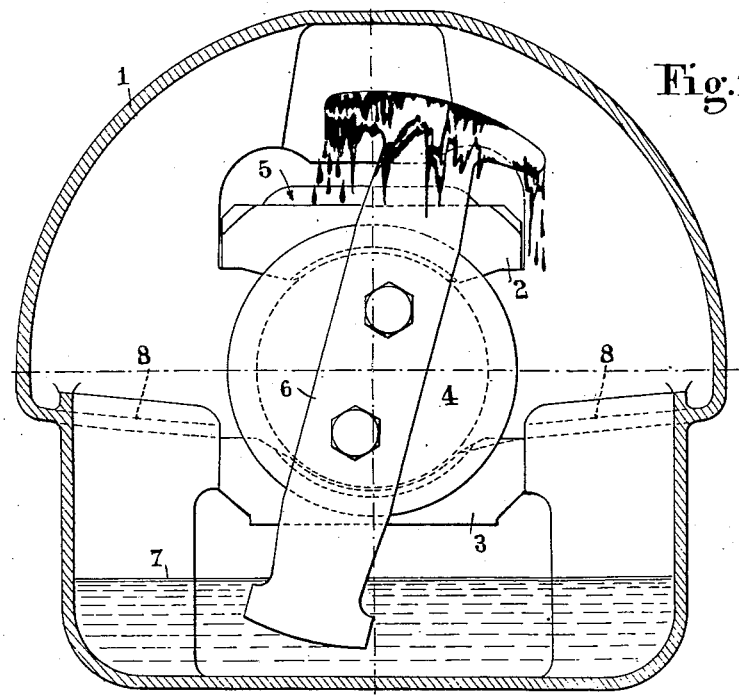
FIGURE 1 is a cross-sectional view showing one portion of an axle box incorporating a stub shaft with upper and lower bearings and a rotary lubricating dasher revolving at low speed.

The axle box shown diagrammatically in FIG. 1 comprises a body proper 1, an upper bearing 2 and a lower bearing 3 fitting on a stub axle 4.

The lubricating recess 5 of the upper bearing 2 is fed by means of a dasher or like splash member 6 taking oil 7 from the bottom sump of the box, the counter-bearing 3 being fed by means of lateral channels 8 formed internally of the box body.

Figure 2:
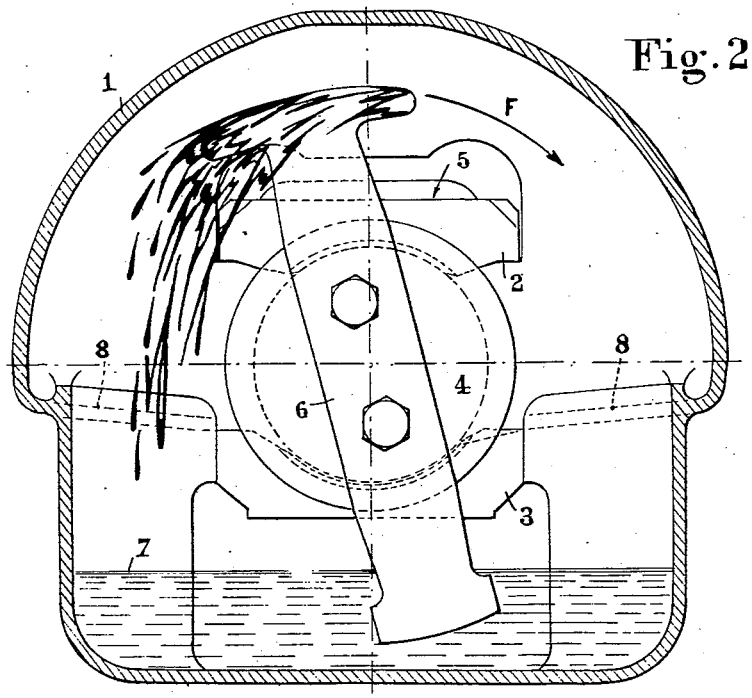
FIGURE 2 is a similar view showing the running of lubricating oil obtaining with the dasher revolving at a higher speed.
Figure 3:
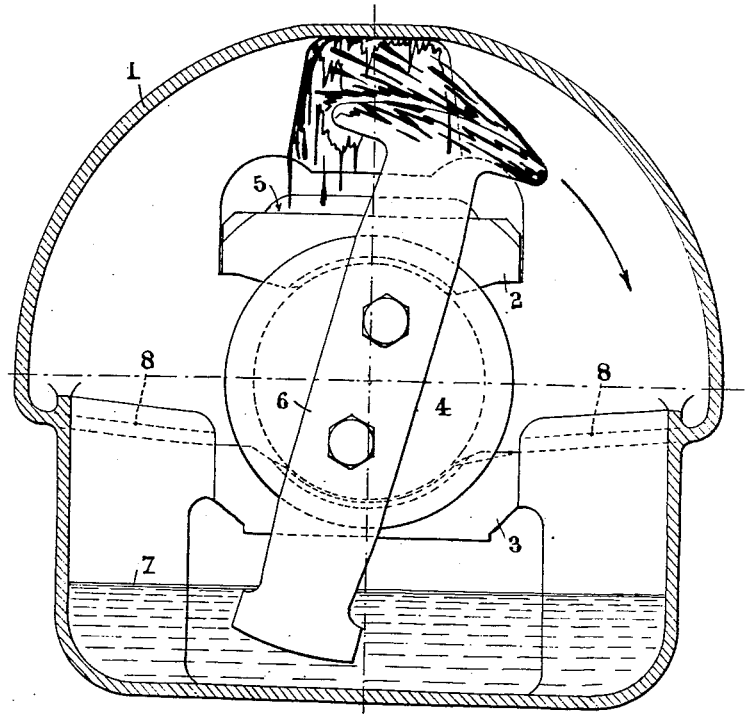
FIGURE 3 is a similar view illustrating the dripping and running action obtaining at high speed.

FIG. 1 shows clearly that at moderate speeds the oil carried along by the dasher 6 is fed only dropwise to the upper bearing; in FIG. 2 it is assumed that the dasher 6 rotates at a somewhat higher speed in the direction of the arrow F, and the oil runs in the opposite direction, whereby one portion falls into the recess or cavity feeding the upper bearing. At high speeds (FIG. 3), the oil-collecting recess of the upper bearing is fed with oil by a combined dripping and splashing action.

Figure 4:
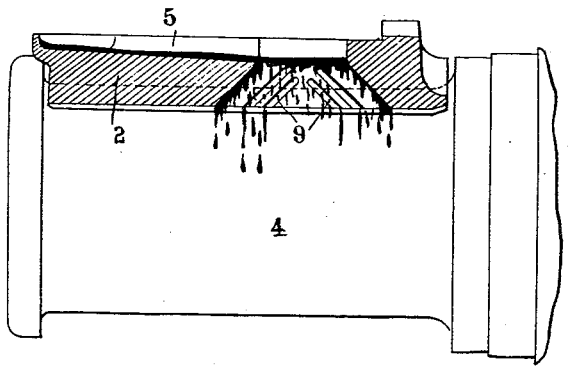
FIGURE 4 is a longitudinal section of the upper bearing positioned on the stub shaft and fed with lubrication oil.
Figure 5:
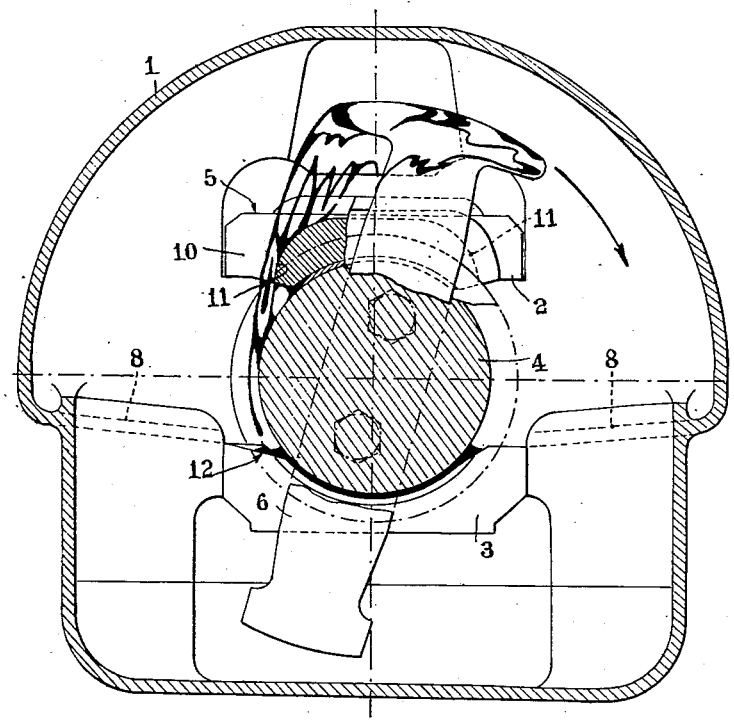
FIGURE 5 is a cross-sectional view showing a box element incorporating the device of this invention.
Figure 6:
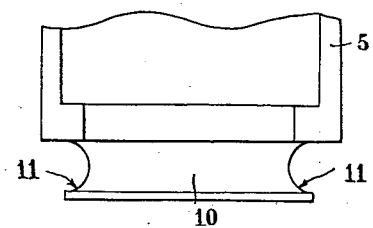
FIGURE 6 is a plan view from above showing one portion of the upper bearing.

In all the cases contemplated in the preceding paragraph the lubricating oil is distributed throughout the bore of the upper bearing by means of ducts 9 as shown more particularly in FIG. 4; at moderate or low speeds, the counter-bearing 3 is not lubricated and at high speeds it will receive only oil projected against the inner walls of the box body and recovered by the aforesaid lateral channels 8.

The device according to this invention consists in providing on each lateral portions of the upper bearing 2 gutter-shaped narrower portions 10 having rounded edges 11 adapted to act as means for directly distributing the lubricating oil to the leading edge 12 of the counter-bearing 3. The width of these two distributing portions 10 must therefore be definitely lower than that of the counter-bearing 3 and even of the stub shaft 4.

One portion of the oil collected in the recess 5 of the upper bearing will flow along the lateral channels 10 and then fall by gravity onto the stub shaft and also into the leading edge of the counter-bearing.

This counter-bearing may continue to be fed at high speed by means of the lateral channels 8 as shown in FIG. 1, but as this channel system is suitable for lubricating the counter-bearing in the speed ranges corresponding to running conditions, that is, from about 3 to 10 m.p.h., it may be considered as sufficient for wagons operated at low speeds.

As anybody conversant with the art will readily understand, in each case the longitudinal edges of the bearing will be cut as a function of the direct-drip lubrication contemplated for the counter-bearing.

Of course, the form of embodiment shown in the drawings and described hereinabove should not be construed as limiting the purpose of the invention and many modifications may be brought thereto without departing from the spirit and scope of the invention as set forth in the appended claims.

What I claim is:

1. In a box for the journal of a railroad car axle, an upper bearing having a lower cylindrical concave face engaging the upper face of the axle journal and an upper face in which an oil-receiving cavity is formed, said bearing having in front of said cavity a narrower end and having formed therethrough channels whereby said cavity can communicate with the upper surface of the axle journal, a lower bearing mounted in said box beneath the lower surface of said journal while providing a gap between said lower surface of the journal and said lower bearing, said lower bearing extending on either side of said journal through a pair of lateral inclined edges toward said gap, and a dipper member taking a lubricating liquid from the bottom of said box for feeding said liquid to said cavity and lubricating through said channels formed in said upper bearing, the lower face of said upper bearing, said narrower front end of said upper bearing having formed therein a transverse groove curved downwards to the vertical on either side of said narrower end, so as to constitute two draining paths along which a liquid feeding by gravity the gap between said lower surface of said journal and said lower bearing may run towards the two inclined edges of said lower bearing.

2. In a railroad car axle box, the combination as set forth in claim 1, wherein said two draining paths are spaced from each other by an internal differing only slightly from the journal diameter.

References Cited in the file of this patent

UNITED STATES PATENTS

| | | |
|---|---|---|
| 157,000 | Haynes | Nov. 17, 1874 |
| 1,905,281 | GrandJean | Apr. 25, 1933 |

FOREIGN PATENTS

| | | |
|---|---|---|
| 563,190 | Germany | Nov. 2, 1932 |
| 546,949 | Italy | Aug. 3, 1956 |